April 17, 1951  R. W. COWARD  2,549,174
WATER-COOLED SHAFT

Filed Aug. 9, 1948  2 Sheets-Sheet 1

Inventor
RICHARD W. COWARD
By Jennings & Carter
Attorneys

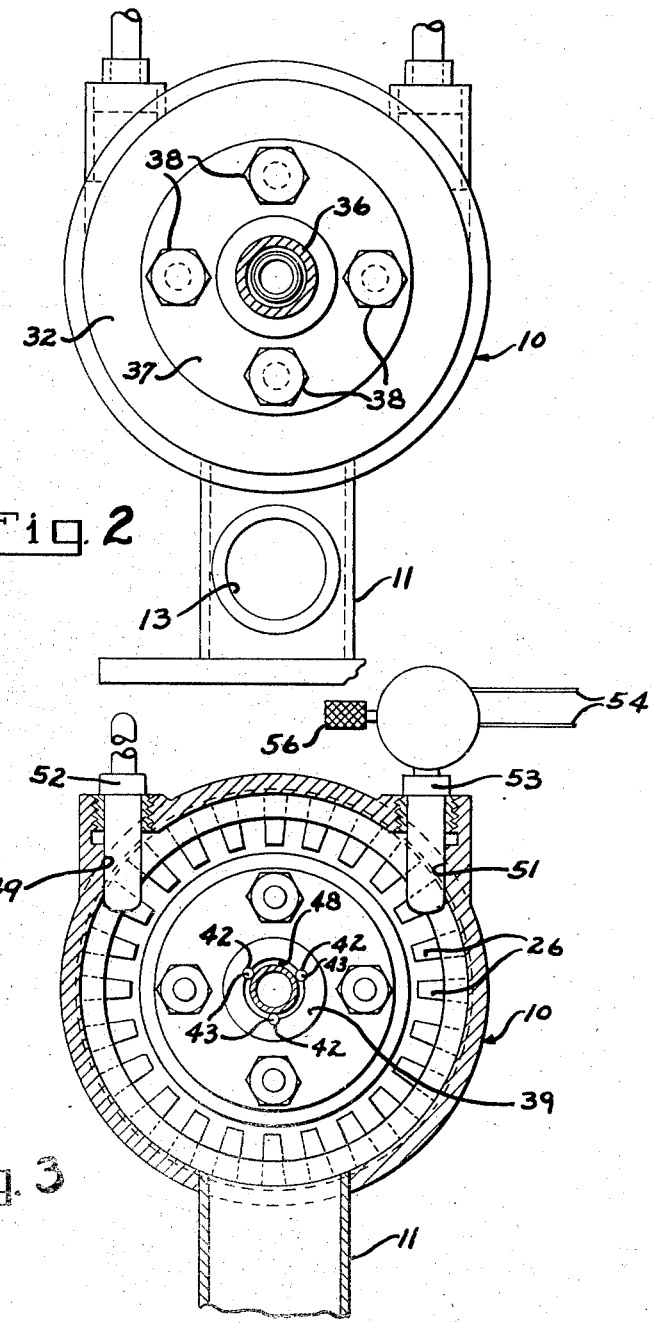

Patented Apr. 17, 1951

2,549,174

UNITED STATES PATENT OFFICE 2,549,174

WATER-COOLED SHAFT

Richard W. Coward, Birmingham, Ala., assignor to Fly Ash Arrestor Corporation, a corporation of Alabama Application August 9, 1948, Serial No. 43,337

2 Claims. (Cl. 308—77)

My present invention relates to water cooled shafts and while not limited thereto, contemplates the provision of a water cooled shaft especially adapted for use in induced draft fans of power plants, wherein as is well understood, the hot flue gases pass around the shaft.

One object is to provide a water cooled shaft embodying means to maintain a quantity of cooling water therein at all times, whereby in event of a momentary stoppage in the water supply, the shaft and bearings will not be damaged before the defect can be corrected.

Another object is to provide a hollow water cooled shaft of the character designated embodying an inner water supply conduit so supported within the hollow shaft that it may expand or contract independently of the shaft.

A further object is to provide at the outer end of the shaft a self-centering support for the inner water conduit thus to assure that the shaft and its inner water conduit are concentric when assembled, thereby eliminating vibration.

A still further object is to provide a water cooled shaft of the character designated in which the end of the shaft projects into a stationary housing, and in which the inner water tube or conduit projects from the opposite side of the housing, together with seals between the housing and shaft and the housing and the conduit so arranged that the housing may be readily slipped off the end of the shaft and conduit to inspect or repair the unit.

Apparatus embodying features of my invention is illustrated in the accompanying drawing forming a part of this application, in which:

Fig. 2 is a sectional view taken along line II—II of Fig. 1, and

Fig. 3 is a sectional view taken along line III—III of Fig. 1.

Figure 1:
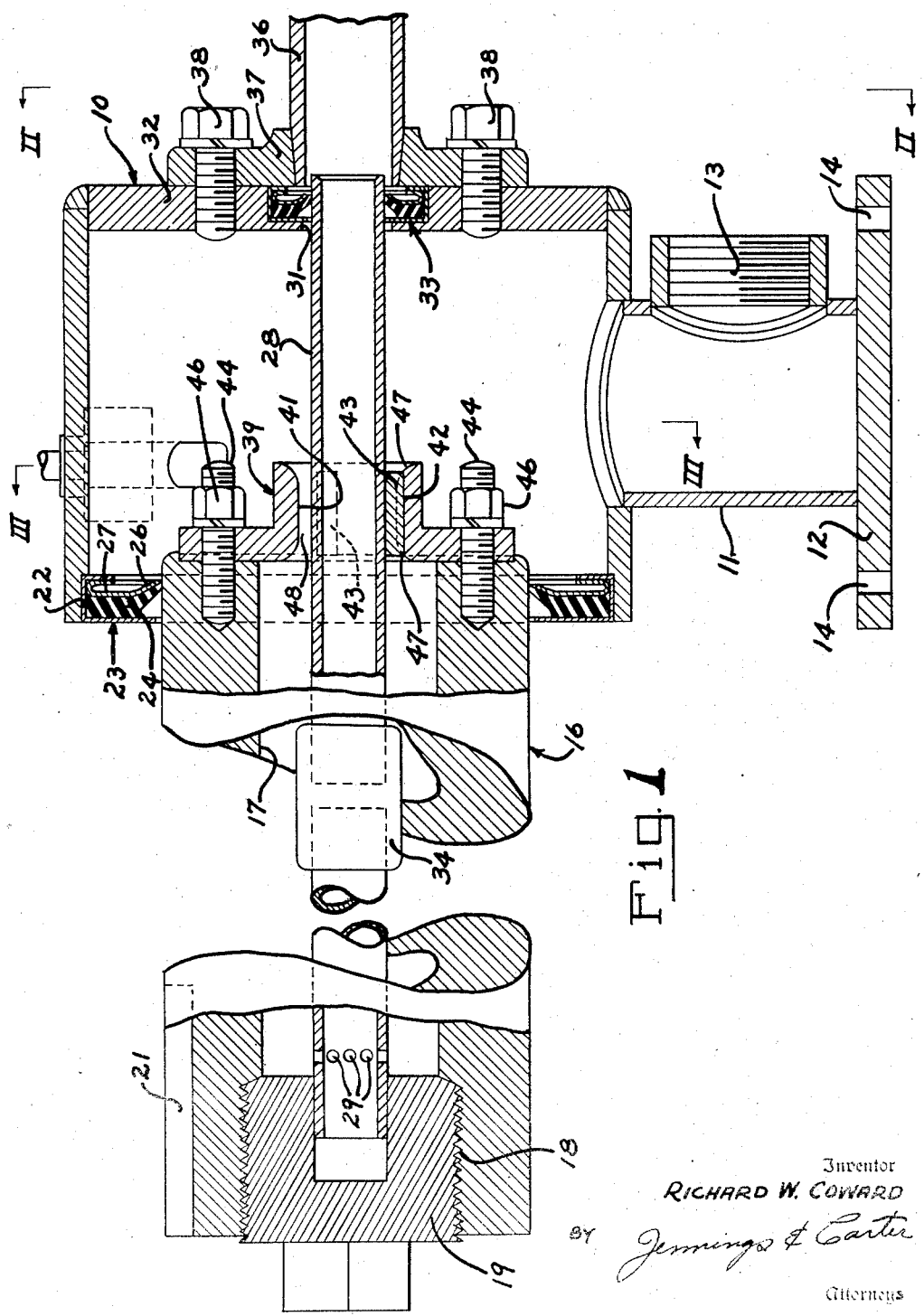
Fig. 1 is a fragmentary longitudinal sectional view of the housing and shaft, parts of the shaft being shown in elevation.

Referring now to the drawings for a better understanding of my invention, I show a housing 10, generally cylindrical in shape and which may be supported on a hollow pedestal 11 having a flanged base 12 and a water outlet opening 13. The base 12 is provided with bolt holes 14 by means of which the entire housing may be supported from any suitable stand, not shown.

The shaft to be cooled is indicated at 16 and, as is well understood in the art, may be of considerable length, shafts for induced draft fans sometimes being as long as twelve feet or more.

The shaft 16 is bored from end to end as indicated at 17 and at one end, hereinafter called the inner end, the bore 17 is threaded as indicated at 18 to receive a bushing 19. The inner end of the shaft is that end which carries the impeller in a single inlet fan, and that end which carries the drive pulley in a double inlet fan. The impeller may be secured to the shaft through a key way 21 and a key, not shown.

The other end of the shaft 16, hereinafter called the outer end, projects into an opening 22 formed in one end of the housing 10, and fitted within the opening 22 is an annular housing seal 23 which has an annular rubber or other flexible gasket 24 mounted therein, which gasket is spring biased against the surface of the shaft by means of resilient fingers 26 formed as integral parts of a ring 27 mounted in the housing at one side of the gasket 24.

Mounted in the bore of the shaft 16 is a water inlet tube 28, the inner end of which fits slidably in the bore of the bushing 19. Adjacent the bushing 19 the tube 28 is provided with a plurality of holes 29, for the egress of water as will be later described. The outer end of the tube 28 projects through an opening 31 formed in the outer side wall 32 of the housing 10, and the resultant opening is closed by means of a seal 33, similar in all respects to the seal 23 except that it is smaller in diameter. As shown, the outer end of the tube 28 may be formed separately from the remainder of the length thereof and connected by means of a coupling 34.

Mounted on the side wall 32 of the housing 10, in line with the tube 28 is a water supply conduit 36 delivering water to the housing from any suitable source not shown. The end of the conduit 36 is held in place by means of an annular flange 37, secured to the housing 10 by means of cap screws 38.

Surrounding the tube 28 is a flanged ring 39. The bore 41 of the ring is provided with three axially extending semicircular grooves 42 spaced equiangularly apart. Fitting within the grooves 42 and secured therein as by soldering are pins 43, which project inwardly of bore, for approximately one-half of their diameter, thereby to lie on a circle of a diameter slightly less than the outside diameter of the tube 28. The tube 28 is pressed between the pins 43 and soldered thereto. The tube 28 is thus held centered within the bore 41, and in spaced relation with respect to the walls thereof. The flanged ring 39 and hence the tube 28 are held assembled to the end of the shaft by means of studs 44 and nuts 46. The ends of the bore of the ring are curved to flare outwardly as indicated at 47, and the cross sectional area of the space 48 between the tube 28 and the bore of the ring 39 is equal substantially to that of the bore of the tube 28, while the cross sectional area of the annulus defined by the ring 39 within the shaft 16 is substantially greater than that of the bore of the tube 28.

The housing 10 is provided with openings 49 and 51 adapted to receive respectively, a thermometer 52 and a temperature responsive switch 53. See Fig. 3. The switch 53 may be connected through suitable circuits 54 to energize a suitable warning device, such for instance as a bell, not shown, when the temperature within the housing 10 reaches a predetermined maximum as determined by the setting of a knurled adjusting screw 56.

From the foregoing, the operation of my improved water cooled shaft will be readily understood. It will be noted that the bore of the ring 39 is considerably less than the bore 17 of the shaft 16. Consequently, when water is admitted to the conduit 36, thence into the tube 28 and the holes 29 into the bore 17 of the shaft, with the shaft rotating, an annulus of water the thickness of which is determined by the ring 39, will be trapped in the bore of the shaft 16. This is substantially greater than the volumetric content of the tube 28, when full. This volume of water constitutes a reserve of cooling water in case of interruption of flow, and the shaft will not overheat until all of this water has evaporated. By such time, the warning would have operated to notify the attendant. The ring 39 therefore acts as a weir over which water must flow before it can return back to the housing for discharge through the outlet opening 13 of the tubular pedestal 11. Since the end of the tube 28, adjacent the seal 33, is subjected to wear, the provision of the coupling 34 makes it possible to replace this end of the tube together with the ring 39 without the necessity of replacing the entire tube. Also, since the ends of the tube 28 fit slidably within the bore of the bushing 19 and the seal 33, the tube 28 may expand and contract independently of the shaft itself, thus eliminating stresses and strains due to differences in expansion. It is also to be noted that the opening 22 and the opening 31 permit the ready removal of the housing 10 from the end of the shaft 16, the only connection between the shaft and the tube 28 being the seals 23 and 33. Likewise, it will be noted that the shaft is free to expand axially, there being no axial restraint thereof at the housing 10. If desired, lugs, not shown, may be secured to the tube 28 intermediate its ends to rest against the walls of the bore 17 thus to support the tube 28 throughout its length.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for cooling a hollow shaft, a housing having an opening in one side through which the outer end of the shaft projects, a tube in the bore of the shaft projecting from the outer end thereof, there being an opening in the side of the housing opposite the first named opening through which the end of the tube projects, there being openings in the wall of the tube adjacent the inner end thereof, a bushing in the inner end of the shaft for slidably receiving the inner end of the tube, an annular weir adjacent the outer end of the shaft within the housing and surrounding the tube, at least three pins interposed between the walls forming the weir opening and the sides of the tube to hold the tube centered with respect to the opening in the weir, a conduit connected to the housing to supply water to the outer end of the tube, and an outlet in the housing for discharging water therefrom.

2. In apparatus for cooling a hollow shaft, a housing having an opening in one side through which the outer end of the shaft projects, a tube in the bore of the shaft projecting from the outer end thereof, there being an opening in the side of the housing opposite the first named opening through which the end of the tube projects, there being openings in the wall of the tube adjacent the inner end thereof, a bushing in the inner end of the shaft for slidably receiving the inner end of the tube, an annular weir adjacent the outer end of the shaft within the housing and surrounding the tube, means to hold the tube centered with respect to the opening in the weir, a conduit connected to the housing to supply water to the outer end of the tube, an outlet in the housing for discharging water therefrom, and flexible seals between the shaft and housing and between the tube and housing, the seals being so disposed that the housing may be slipped off the end of the shaft and tube.

RICHARD W. COWARD.

REFERENCES CITED

The following references are of record in the file of this patent:

UNITED STATES PATENTS

| Number | Name | Date |
|---|---|---|
| 1,404,538 | Mitchell | Jan. 24, 1922 |
| 1,439,491 | Stehli | Dec. 19, 1922 |

FOREIGN PATENTS

| Number | Country | Date |
|---|---|---|
| 39,950 | Norway | Oct. 13, 1924 |
| 570,408 | Germany | Feb. 15, 1933 |